United States Patent Office 3,349,945
Patented Oct. 31, 1967

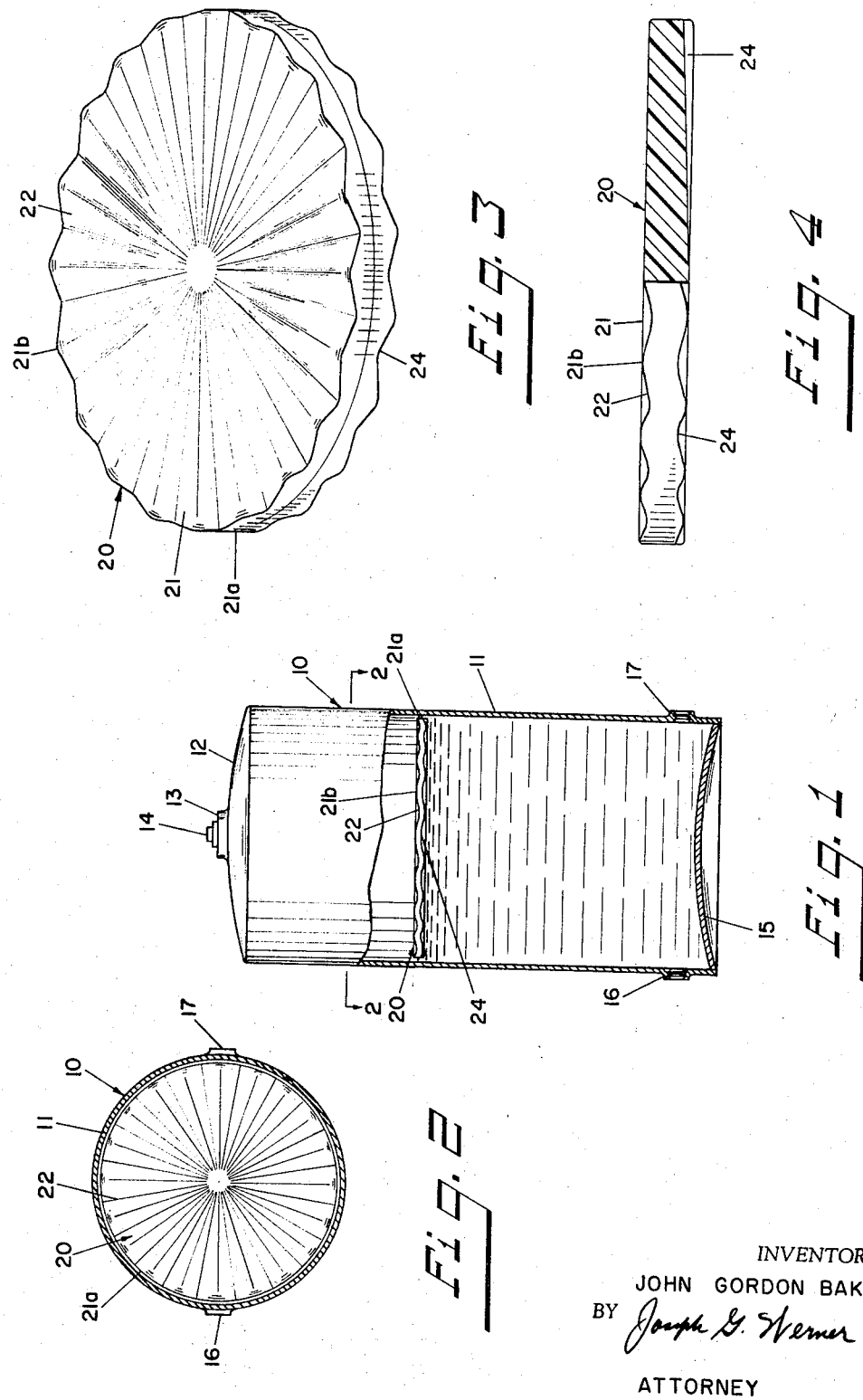

3,349,945
FLOAT FOR HYDROPNEUMATIC TANK
John Gordon Baker, Evansville, Wis., assignor to Baker Manufacturing Co., Evansville, Wis., a corporation of Wisconsin
Filed Feb. 7, 1966, Ser. No. 525,503
4 Claims. (Cl. 220—26)

ABSTRACT OF THE DISCLOSURE

A float for separating the air and liquid in a hydropneumatic pressure tank in the form of a substantially flat circular disc for floating on the liquid in said tank. The disc has a plurality of radially extending grooves with tangentially sloping surfaces in its top and bottom surfaces which grooves extend deeper into the disc at their outer ends than at their inner ends to facilitate the runoff of liquid from the top surface of the disc and the escape of gas from beneath the bottom surface of the disc.

This invention relates generally to hydropneumatic tanks and more particularly to the floats for separating the air from the water in such tanks as used in domestic water supply systems. One type of such float is described in my co-pending U.S. patent applications S.N. 136,875 and S.N. 261,896.

In a typical domestic water supply system, water is pumped into a hydropneumatic tank until a predetermined maximum pressure is reached at which time a pressure switch shuts off the pump. The pressure switch turns the pump on when the pressure in the tank drops below a predetermined minimum. With compressed air in contact with the water in the tank, the air is slowly absorbed by the water. Floats are used to separate most of the water surface from the air and thus greatly reduce the loss of air through absorption and extend the time the tank may be used without replenishing the air.

Irregularities in the tank may cause the float to be temporarily tilted as it rises and descends on the water in the tank. Such tilting may cause both water flow onto the top of the float and ventilation under the float. Since in either case the air water contact is increased, air absorption by the water is also increased. Water may also flow on top of the float in those cases where the float descends below a point of water entry.

A primary object of my invention is to provide a new and improved float for separating the air from the liquid in a hydropneumatic tank.

Another object of my invention is to provide a substantially flat float for separating the air from the water in a hydropneumatic tank wherein the float has the means to facilitate both the escapement of air from under the float and the run off of water from the top surface of float to reduce the amount and time of air water contact.

Another object of my invention is to provide a substantially flat float for separating the gas from the liquid in an accumulator vessel wherein the float has means to facilitate the escapement of gas from under its bottom surface without allowing unnecessary gas-liquid contact.

Another object of my invention is to provide a substantially flat float for separating the gas from the liquid in an accumulator vessel wherein the float has a plurality of radially extending tapered grooves in its top and bottom surfaces to facilitate the run-off of liquid from its top surface and the escapement of gas from under its bottom surface without allowing unnecessary gas-liquid contact.

Another object of my invention is to provide a float shape which minimize surface tension retention of air bubbles underneath float and of water droplets on top of float through tangential slopes of lower and upper surfaces to facilitate air movement on the lower surface to enlarge air bubbles and water movement on the upper surface to enlarge water droplets.

Further objects, features and advantages of my invention will be apparent from the following detailed description taken in conjunction with the accompanying drawings wherein a preferred embodiment of the principles of my invention has been selected for exemplification.

In the drawings:

FIG. 1 is an elevational view of a pressure tank with a portion of its wall broken away to show a float embodying my invention therein.

FIG. 2 is a sectional view taken along lines 2—2 of FIG. 1.

FIG. 3 is a perspective view of a float embodying my invention.

FIG. 4 is an edge view partially in section of a float embodying my invention.

While my invention is particularly well suited for use in and will be described in connection with a vertical, cylindrical pressure tank as commonly used in domestic water supply systems in which air is used as the compressible equalizing medium, it is understood that my invention can be utilized in a variety of accumulator vessels for separating various gases and liquids.

Referring now more particularly to the drawings wherein like numerals refer to like parts throughout the several views. FIG. 1 shows an accumulator vessel in the form of a conventional vertically disposed pressure tank 10 having a cylindrical wall 11 made of sheet steel. A domed header 12 is welded to the top end of the tank wall 11. The header 12 has a threaded portion 13 for receiving a suitable threaded plug 14 in sealed relation. The bottom of tank 10 is formed by a dished, sheet steel bottom plate 15, which is welded to the bottom end of the cylindrical tank wall 11.

The wall 11 of tank 10 is provided with a threaded inlet portion 16 for receiving a threaded inlet pipe (not shown) through which water is supplied to the pressure tank 10 by a conventional pump (not shown). A threaded outlet portion 17 is provided for drawing water from the pressure tank 10 through an outlet pipe (not shown) for use.

The above described type of pressure tank is in common use in domestic water supply systems.

In practicing my invention, a float 20 is placed in the pressure tank 10 before the domed header 12 is welded in place.

The preferred form of float 20 is best illustrated in FIGS. 2–4 and comprises a substantially flat disk 21 made of a material which will float on the water or other liquid in the pressure tank 10. The disk material should be sufficiently rigid to withstand the pressures acting on it in the tank and sufficiently resistant to abrasion to prevent substantial wear due to rubbing against inner surface of the wall 11 of the tank 10. The disk material should also be dimensionally stable and substantially impervious to water or other liquid which will be accumulated in the tank 10 and substantially impervious to air or other gas which may be used as the compressible medium. The disk material should retain these characteristics for the life of the pressure tank 10.

The float 20 shown is made of expanded polystyrene having a density of about 8 pounds per cubic foot; however, other suitable materials may be satisfactorily employed.

As best seen in FIGS. 1 and 2, the disk 21 is of such a size as to substantially fill the interior of the tank transversely, no more space being left between the peripheral edge 21a of the disk 21 and the inner surface of wall 11 of the tank 10 than is necessary to prevent the float from binding.

As seen in FIGS. 2–4, the top surface of the disk 21 has a plurality of radially extending grooves 22 therein. The grooves 22 extend from adjacent the mid-portion of the disk outwardly to its peripheral edge 21a. The grooves 22 are tapered and preferably get progressively deeper and wider toward the peripheral edge 21a of the disk 21.

The grooves 22 in the top surface of disk 21 permit any water which accumulates on the top surface of the disk 21 to run off over the peripheral edge 21a of the disk. Water may flow onto the top of the disk 21 when the tank is initially filled or when it is refilled after having been drained because when the disk 21 rests on the bottom plate 15 its upper surface may be below the top of the inlet 16 in the tank wall. As mentioned hereinbefore, water may also collect to some extent on the top surface of the disk in the event the disk becomes temporarily tipped as it is floating up or down in the tank should it be caught up on a spud or other internal irregularity in the tank wall 11.

The bottom surface of the disk 21 is also provided with a plurality of radially extending grooves 24 similar to the grooves 22 in the top surface of the disk. These bottom grooves 24 are preferably alternately positioned with respect to the radially extending grooves 22 in the top surface of the disk 21 so as to structurally strengthen the disk. Like grooves 22, the grooves 24 in the bottom surface of disk 21 preferably are tapered and get progressively deeper and wider toward the peripheral edge 21a of the disk 21. The function of the bottom grooves 24 is to allow any air which may collect under the disk 21 to escape to above the disk. Air may collect under the disk 21 should the disk become temporarily tipped and also when air is introduced into the pressure tank 10 to replenish the air supply. Such introduction of air into the tank may be necessary from time to time, even with the use of my float, although much less frequently than in tanks with no such float.

Preferably the density of the disk material should be such that when the disk is floating freely on the water or other liquid in the pressure tank 10, the bottom grooves 24 are completely submerged in the water or liquid so that no air space is left under the disk.

It is apparent that my new and improved float for separating the gas from the liquid in an accumulator vessel facilitates the run-off of liquid from the top surface of the float and the escapement of gas from under the bottom surface of the float without allowing unecessary liquid-gas contact through substantially vertical drain holes or the like.

It is understood that my invention is not confined to the particular construction and arrangement of parts herein illustrated and described, but embraces all such modified forms thereof as come within the scope of the following claims.

I claim:
1. A float for separating gas from liquid in an accumulator vessel having a substantially vertical cylindrical wall, comprising:
   (a) a substantially flat circular disk of buoyant material for floating on the liquid in said accumulator vessel,
   (b) said disk having a plurality of radially extending grooves with tangentially sloping surfaces in its top surface and in its bottom surface,
   (c) said grooves extending deeper into said disk at their outer ends than at their inner ends to facilitate the run-off of liquid from said top surface and escape of gas from under said bottom surface.

2. The float as specified in claim 1 wherein the density of the float is such that the grooves in the bottom surface of said disk are substantially submerged when said disk is floating freely on the liquid in said accumulator vessel.

3. A float for separating gas from lquid in an accumulator vessel having a substantially vertical cylindrical wall, comprising:
   (a) a substantially flat circular disk for floating on the liquid in said accumulator vessel,
   (b) said disk having a plurality of radially extending grooves in its top surface and in its bottom surface,
   (c) said grooves extending deeper into said disk at their outer ends than at their inner ends to facilitate the run-off of liquid from said top surface and escape of gas from under said bottom surface,
   (d) said radially extending grooves in said top surface being alternately positioned with respect to said radially extending grooves in said bottom surface.

4. A float for separating gas from liquid in an accumulator vessel having a substantially vertical cylindrical wall, comprising:
   (a) a substantially flat circular disk for floating on the liquid in said accumulator vessel,
   (b) said disk having a plurality of radially extending grooves in its top surface and in its bottom surface,
   (c) said grooves extending deeper into said disk at their outer ends than at their inner ends to facilitate the run-off of liquid from said top surface and escape of gas from under said bottom surface,
   (d) said radially extending grooves in said top surface being tangentially offset one-half the width of one of said grooves from the radially extending grooves in said bottom surface.

References Cited

UNITED STATES PATENTS

| | | | |
|---|---|---|---|
| 2,886,204 | 5/1959 | Moyer et al. | 220—26 |
| 3,256,977 | 6/1966 | Patterson | 220—26 |

THERON E. CONDON, *Primary Examiner.*

JAMES B. MARBERT, *Examiner.*